United States Patent [19]

Hall

[11] Patent Number: 5,728,911
[45] Date of Patent: Mar. 17, 1998

[54] PROCESS FOR THE PREPARATION OF LOW MOLECULAR WEIGHT COPOLYMERS OF ETHYLENE WITH AT LEAST ONE OTHER 1-ALKENE

[75] Inventor: James R. Hall, Baton Rouge, La.

[73] Assignee: DSM Copolymer, Inc., Baton Rouge, La.

[21] Appl. No.: 562,910

[22] Filed: Nov. 27, 1995

Related U.S. Application Data

[63] Continuation of Ser. No. 80,556, Jun. 21, 1993, abandoned.

[51] Int. Cl.$^6$ ............... C07C 2/32; C07C 2/22; C07C 2/38

[52] U.S. Cl. ............ 585/508; 585/507; 585/513; 585/523; 585/700; 585/728; 585/733; 585/16; 585/18

[58] Field of Search .................. 585/16, 18, 507, 585/508, 513, 523, 700, 728, 733

[56] References Cited

U.S. PATENT DOCUMENTS

| | | | |
|---|---|---|---|
| 3,574,176 | 4/1971 | Boozer | 526/136 |
| 3,645,993 | 2/1972 | Sunseri | 526/136 |
| 4,168,358 | 9/1979 | Harada et al. | 526/143 |
| 4,435,552 | 3/1984 | Evens | 526/140 |

FOREIGN PATENT DOCUMENTS

| | | | |
|---|---|---|---|
| 0346098 | 12/1989 | European Pat. Off. | 526/143 |

*Primary Examiner*—Mark Nagumo
*Attorney, Agent, or Firm*—Dressler, Rockey, Milnamow & Katz, Ltd.

[57] ABSTRACT

A copolymer having an RSV less than 0.6 and a process for its preparation in which ethylene, at least one other 1-alkene and, optionally, an aliphatic or alicyclic polyunsaturated monomer are polymerized in the presence of a catalyst system containing (1) a compound of vanadium, (2) at least one alkyl aluminum halide, (3) an α-halo, ketoaromatic promoter and (4) a chain transfer agent in which the molar ratio of alkyl groups of the alkyl aluminum halide to halogen atoms is at least 1.5.

12 Claims, No Drawings

PROCESS FOR THE PREPARATION OF LOW MOLECULAR WEIGHT COPOLYMERS OF ETHYLENE WITH AT LEAST ONE OTHER 1-ALKENE

This is a continuation of application Ser. No. 08/080,556 filed on Jun. 21, 1993, now abandoned.

BACKGROUND OF THE INVENTION

This invention relates to an improved solution process for the preparation of very low molecular weight copolymers of ethylene with at least one other 1-alkene and optionally up to twenty weight percent of a polyunsaturated compound in which the copolymers can be separated from the polymerization solution with low chloride levels.

It has been known for sometime that ethylene can be copolymerized with at least one other 1-alkene in the presence of what has become known as a Ziegler catalyst. Typically such catalyst systems are made up of compounds of vanadium, and, as an activator therefor, alkyl aluminum halides. One of the disadvantages of such systems is there is relatively low activity, particularly when very low molecular weight copolymer are prepared. That means that the cost of catalyst per weight unit of copolymers produced can be quite high. Apart from those economics, the lower activity, lower catalyst mileages result in larger quantities of catalyst residues in the copolymers fed to the conventional purification process, consequently the copolymers are isolated with higher residual catalyst residues, rendering them unfit for certain applications.

Improvements over such catalyst systems used in the preparation of copolymers of ethylene with at least one other 1-alkene are described in U.S. Pat. Nos. 4,420,595 and 4,435,552. Those patents describe the use of a Ziegler catalyst system in combination with a promoter which serves to increase polymer yields per weight unit of catalyst, however, not sufficiently high so that catalyst removal is no longer necessary. The promoters described in the foregoing patents are halogen-containing compounds, one of the preferred compounds being dichlorophenyl acetic acid ethyl ester, hereinafter referred to as DCPAE.

The foregoing patents describe, as the activator for the Ziegler system, a variety of aluminum compounds including triethyl aluminum, diethyl aluminum chloride, monoethyl aluminum dichloride and ethyl aluminum sesquichloride, or mixtures thereof, however, it teaches only the use of ethyl aluminum sesquichloride. The foregoing patents indicate that the molecular weight of the polymers produced can be controlled through the use of well known chain regulators, such as acetylene, zinc alkyls, alkyl halides and hydrogen. The foregoing patents are silent on molecular weight ranges and distribution.

In fact, many references such as U.S. Pat. Nos. 3,562,228 and 3,706,718 teach that use of a promoter, or Lewis bases which prolong or enhance the activity of the vanadium based Ziegler catalyst systems tend to produce higher molecular weight polymers.

U.S. Pat. Nos. 3,441,546 and 3,444,149 teach improved Ziegler catalyst efficiency and production of lower molecular weight copolymers (intrinsic viscosity of 1.5 to 2.5) when organonitro compounds or quinones and mixtures of quinones with N-nitroso amines are employed with a vanadium compound and ethyl aluminum sesquichloride (EASC) providing the order of addition of the catalyst components is carefully controlled.

Use of amines in synergy with promoters to alter the Ziegler polymerization is taught in U.S. Pat. Nos. 3,574,176 and 3,645,993. A very broad group of amines is described as a suppressor for molecular weight jumps or gel formation during terpolymerization of EPDM. It is taught that the amines improve yields, prevent cationic polymerization and generally give a more uniform product. The amines in synergy with halogenated organic compounds such as n-butylperchlorocrotonate, trichloroacetonilide, and hexachloroacetone are claimed to increase catalyst mileage. However, molecular weight of the terpolymers were seen to increase or decrease depending on the specific combination of amine and halogenated organic compounds. A limitation of these synergistic combinations is that the terpolymers generally contained high residual chlorides after purification.

Factors controlling molecular weight and molecular weight distribution during polymerization of EPM and EPDM with vanadium catalyst are summarized in the Journal of Polymer Science, Macromolecular Review, Volume 10, pages 70–97, published 1975.

A. Gumboldt, et al. in *Makromolecular Chemie* 101 (1967), pages 229–245 suggests that a lower molecular EPM can be obtained when a vanadium oxytrichloride ($VOCl_3$) and diethylaluminum chloride (DEAC) catalyst system is reactivated by hexachlorocyclopentadiene compared to reactivation of the $VOCl_3$/EASC System. They do not teach, however, how to control molecular weight at a specific range or value.

E. Junghams, et al. in *Makromolecular Chemie*, 58, 1963, pages 1–39, disclosed that the specific aluminum compound had an effect on polymer molecular weight, measured as intrinsic viscosity, and generally the relationship was decreasing in value over the range $AlR_3$ was greater than $AlRCl_2$ was greater than $Al_2R_3Cl_3$ was greater than $AlR_2Cl$. Precise control of molecular weight and molecular weight distribution was not addressed, nor was ability to make very low molecular weight copolymers discussed.

Many references such as U.S. Pat. No. 3,706,718, and Evens, et. al. Transition Metal Catalyzed Polymerizations, R. P. Quirk, ed., (1988), p. 782, teach that there is no discrimination in molecular weight effects between DEAC and EASC in the presence of promoters or Lewis bases or that molecular weight may sometimes increase. Effects vary with different third components and concentrations. Boor, in Ziegler-Natta Catalysts and Polymerization, Academic Press, 197, Chapter 9, p. 213–214 concluded that the effects of third components often appear contradictory and cautioned that stated effects operate generally under 'very narrow conditions and for specific catalysts only', and 'the broad claims of patents should be ignored when interpreting data, unless they are confirmed by experimental samples'.

None of the prior art references teach how to prepare very low molecular EPM and EPDM, that is, those with molecular weights measured as a Reduced Specific Viscosity (RSV) less than 0.6.

While the processes described in the foregoing patents represents an improvement over the art, there is nonetheless a need to produce in large scale copolymers having low levels of catalyst residues, particularly chlorides, and having low molecular weights such that the reduced specific viscosity (RSV) is less than 0.6. Such low molecular weight polymers having RSVs of less than 0.6 are particularly useful as additives in lubricating oil compositions, synthetic lubricants, thermoset resin modifiers, sealants, caulks and adhesives.

It is accordingly an object of the present invention to provide a process for the copolymerization of ethylene with other monomers and the copolymers produced thereby that have low molecular weights, narrow molecular weight distribution and can be prepared in conventional solution polymerization process equipment.

It is a more specific object of the present invention to provide a solution process for the copolymerization of ethylene with at least one other 1-alkene to produce EPM and optionally with a polyunsaturated monomer to produce EPDM copolymers having low molecular weights such that the (RSV) is less than 0.6 and the residual chloride content permits broad commercial use.

These and other objects and advantages of the invention will appear more fully hereinafter from the present specification.

SUMMARY OF THE INVENTION

The concepts of the present invention reside in the solution process for the copolymerization of ethylene, at least one other 1-alkene and optionally up to 20 percent by weight of an aliphatic or alicyclic unsaturated monomer in the presence of a vanadium based Ziegler catalyst system comprising a compound of vanadium, an activator in the form of an alkyl aluminum halide, an α-halo ketoaromatic catalyst promoter, a chain transfer agent and a nitrogen containing Lewis base in which the molecular weight is controlled such that an RSV less than 0.6 is obtained by controlling the amount of chain transfer agent particularly hydrogen, the ratio of alkyl groups to halogen atoms in the alkyl aluminum halide activator and the amount of Lewis base. It has been surprisingly found that the control of the ratio of alkyl groups to halogen atoms above about 1.5, and preferably within the range of 1.75 to 2.5, yields polymers having very low molecular weights and narrow molecular weight distributions that can be readily separated from the catalyst residues and solvent utilizing conventional polymerization process equipment.

In accordance with the most preferred practice of the invention, use is made of an alkyl aluminum halide having a molar ratio of alkyl group to halogen atoms of 2.0, as the Ziegler catalyst activator, a catalyst promoter and a nitrogen containing Lewis base. It has been unexpectedly found that the specific combination of activator, promoter, and Lewis base can provide copolymers with RSVs less than 0.6 and low residual chlorides.

It has been found that polymers produced according to the process of this invention are unique in exhibiting RSVs generally below 0.6, and preferably below 0.5. The polymers of the present invention are further characterized by a molecular weight distribution (MWD) which sets them apart from polymers produced by processes in which the molar ratio of alkyl groups to halogen atoms is below 1.5. Molecular weight distribution as determined by gel permeation chromatography (GPC) is frequently expressed as the ratio of the weight average molecular weight divided by the number average molecular weight. The copolymers of the present invention have been found to have MWDs of 2.0 or below, whereas copolymers produced by conventional methods using molar ratios of alkyl groups to halogen atoms of below 1.5 have MWDs greater than 2.0.

DETAILED DESCRIPTION OF THE INVENTION

The present invention is well suited for the preparation of EPM copolymers as well as EPDM copolymers. In the preferred practice of the invention, copolymers are prepared containing from 25 to 85 percent by weight of ethylene and 15 to 75 percent by weight of at least one other 1-alkene or mixtures of 1-alkenes. As the 1-alkene use can be made of 1-alkenes containing 3 to 12 carbon atoms. Representative of such 1-alkenes are propylene, butene-1, pentene-1, hexene-1, octene-1, as well as branched isomers thereof such as 4-methyl pent-1-ene. Use also can be made of styrene, alpha-methyl styrene or mixtures of these with the alkenes described in the foregoing. Propylene is usually preferred as the 1-alkene.

The copolymers prepared in accordance with the practice of the invention may also include up to 20 percent by weight of aliphatic or alicyclic polyunsaturated monomers. Preferred are those monomers which contain at least 2 carbon-to-carbon double bonds and 3 to 20 carbon atoms. Among the aliphatic polyunsaturated compounds are the conjugated dienes as represented by 1,3-butadiene, isoprene, 2,3-dimethylbutadiene, etc. and non-conjugated dienes such as hexadienes, octadienes, or branched isomers thereof.

The alicyclic polyunsaturated monomers used in the practice of the present invention may be either mono or polycyclic. Illustrative of such polycyclic compounds are norbornadiene and its alkyl derivatives; the alkylidene norbornenes, and particularly the 5-alkylidene-2-norbornenes in which the alkylidene group contains 1 to 8 carbon atoms; the alkyl norbornenes, and particularly the 5-alkylene-2-norbornenes in which the alkylene group contains 2 to 10 carbon atoms. Preferred among such classes of compounds are dicyclopentadiene, 5-methylene-2-norbornene, 5-vinyl-2-norborenene, 5-ethylidene-2-norbornene, etc.

The polyunsaturated compounds may be present in the polymer in quantities of up to 20% by weight, preferably up to 10% by weight.

The monomers employed in the practice of the present invention are copolymerized in the presence of the Ziegler-type catalyst system using, in the preferred embodiment, a compound of vanadium. Preferred compounds are the usual Ziegler catalyst compounds including vanadium tetrachloride, vanadium tetrabromide, vanadium oxytrichloride, vanadium acetyl acetonate. While use can be made of compounds of other metals of groups IVb to VIb of the Mendeleeff Periodic Table which have been used as the Ziegler catalysts, preferred in the practice of this invention are compounds of vanadium which are soluble in the polymerization medium.

As the activator in the Ziegler catalyst system employed in the practice of this invention, use is preferably made of aluminum compounds, and particularly alkyl aluminum halides wherein the alkyl group contains 1 to 30 carbon atoms and more particularly 1 to 10 carbon atoms and wherein the halogen atom or atoms is either chlorine or bromine. Representative of such aluminum compounds include triethyl aluminum, diethyl aluminum chloride, diisobutyl aluminum chloride, monoethyl aluminum dichloride and ethyl aluminum sesquichloride and mixtures thereof. Preferred for use in the present invention is a dialkyl aluminum halide such as diethyl aluminum chloride.

It is an important concept of the present invention that the ratio of alkyl groups to halogen atoms of the activator be carefully controlled to insure that the ratio of alkyl groups to halogen atoms be at least 1.5. As explained above, it has been surprisingly found that when the ratio of alkyl groups to halogen atoms is maintained at 1.5 or higher, the molecular weight of the resulting copolymer can be controlled quite low using quantities of hydrogen compatible with the solution polymerization process. Typically, ratios of alkyl groups to halogen atoms above 1.5 provide copolymers with RSVs below 0.6, and with a MWD of less than 2.0.

Use of diethyl aluminum chloride provides a ratio of alkyl groups to halogen atoms of 2.0. In general, use can be made of a mixture of alkyl aluminum halides such that the overall ratio of alkyl groups to halogen atoms ranges from 1.75 to 2.5. For example, use can be made of a combination of ethyl aluminum sesquichloride and triethyl aluminum in proportion such that the overall ratio of alkyl groups to halogen atoms is at least 1.5, and is preferably 1.75 to 2.0. Where ratios greater than 2.0 are desired, a mixture of a dialkyl aluminum halide and trialkyl aluminum are more conveniently employed. The activators can be preblended or fed as separate streams to the polymerization reactor.

The catalyst promoter used in the practice of the invention is a catalyst promoter of the type described in the forgoing U.S. Pat. Nos. 4,420,595 and 4,435,552, the disclosures which are incorporated by reference. The preferred promoters are α-halo ketoaromatic promoters characterized as:

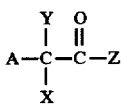

wherein
- A is a phenyl group which may contain one or two substituent halogen atoms or alkyl groups, or is a thienyl, furyl, pyrrolyl, N-alkyl pyrrolyl or pyridyl group,
- X is a chlorine or bromine atom,
- Y is a chlorine, bromine, a hydrogen atom, a hydrocarbon group with 1–8 carbon atoms or A, and
- Z is a group of any one of the following formulas 1–8, in which both R and R' are a hydrocarbon group with 1–8 carbon atoms:

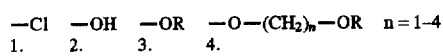

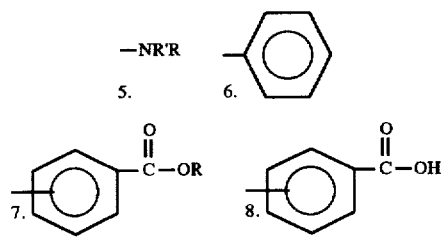

Preferably halogen-containing compounds are applied which contain one or two halogen atoms, in particular chlorine atoms, to each molecule. More particular, preference is given to the alkyl and alkoxy alkyl esters of phenyl dichloracetic acid, of diphenyl chloroacetic acid and of (2-thienyl)mono or dichloro-acetic acid. However, compounds containing more halogen atoms may also be applied. Suitable halogen-containing compounds notably are: phenyl mono- or di-chloroacetic acid, phenyl mono- or di-bromoacetic acid, ethyl chlorophenyl acetate, ethyl dichlorophenyl acetate, propyl chlorophenyl acetate, propyl dichlorophenyl acetate, butyl chlorophenyl acetate, butyl dichlorophenyl acetate, ethyl bromophenyl acetate, ethyl dibromophenyl acetate, butyl bromophenyl acetate, butyl dibromophenyl acetate, methoxy ethyl chlorophenyl acetate, methoxy ethyl dichlorophenyl acetate, methoxy ethyl bromophenyl acetate, methoxy ethyl dibromophenyl acetate, ethyl 2-chloro-3-oxo-3-phenyl propionate, ethyl 2,2-dichloro-3-oxo-3-phenyl propionate, ethyl 2-bromo-3-oxo-3-phenyl propionic acid, ethyl 2,2-dibromo-3-oxo-3-phenyl propionic acid, 2,2-dichloro-3-oxo-3-phenyl propionic acid, 2-bromo-3-oxo-3-phenyl propionic acid, butyl 2,2-dibromo-3-oxo-3-phenyl propionate, diphenyl chloro-acetic acid, methyl chlorodiphenyl acetate, ethyl chlorodiphenyl acetate, bromodiphenyl acetic acid, ethyl bromodiphenyl acetate, butyl bromodiphenyl acetate.

The process of the present invention is carried out under conventional conditions of the kind described in the foregoing U.S. patents, the disclosures of which are incorporated herein by reference. Good results are usually obtained when the polymerization reaction is carried out at a temperature ranging up to 100° C., and preferably 0° to 80° C. As those skilled in the art will appreciate, such reactions are carried out typically in inert organic solvents, and the pressure of the reaction depends in part on the solvent employed as well as the temperature employed. Reaction pressures are generally within the range of 1 to 30 atmospheres, but either higher or lower pressures can be used. As the solvent, use is preferably made of any of a variety of saturated aliphatic hydrocarbon solvents which are inert to the catalyst. In general, it is preferred to employ solvents in which the Ziegler-type catalyst system is soluble. Particularly preferred are solvents such as butane, pentane, hexane, heptane, pentamethyl heptane, or petroleum fractions. Other suitable solvents include aromatic hydrocarbons such as benzene or toluene or halogenated aliphatic or aromatic hydrocarbons such as tetrachloroethylene.

In carrying out the polymerization reaction of the present invention, the molar ratio of the alkyl aluminum halide activator and the vanadium compound is conventional and can be varied between wide limits. In general, that ratio ranges from 1:1 to about 1500:1 more particularly between 3:1 and 30:1. Similarly the ratio of the catalyst promoter to vanadium compound is conventional, and can be typically varied from a molar ratio of 0.1:1 to about 300:1, and preferably within the range of 1:1 to 50:1.

The nitrogen containing Lewis base used in the practice of this invention is selected from the group consisting of ammonia, aliphatic non-cyclic amines, aliphatic cyclic amines and aromatic amines. Preferably the amines employed in the practice of the invention are primary and secondary aliphatic, either cyclic or non-cyclic, amines and primary and secondary aromatic amines. Representative of the preferred Lewis bases are ammonia, piperidine, pyridine and pyrrole. Such preferred amines are generally soluble in the polymerization solvent. The amine is fed directly to the polymerization solvent such that the concentration is within the range of 0.5 to 3 millimoles per liter of polymerization solvent.

In the preferred practice of the invention, it is necessary to employ conventional chain transfer agents or chain regulators in further limiting the molecular weight of the copolymer produced in the practice of this invention. Typical chain regulators are well known to those skilled in the art and are described in the forgoing patents; they include acetylene, zinc alkyls, alkyl halide, and, preferably, hydrogen.

The polymers of the present invention find particular application as viscosity improvers in lubricating oil compositions, synthetic lubricants, thermoset resin modifiers, and additives for caulks, sealants and adhesives.

Having described the basic concepts of the invention, reference is now made to the following examples which illustrate the practice of the invention and the unexpected results obtained thereby.

EXAMPLES

All polymerizations were carried out according to the following procedure.

Continuous polymerization reactions were carried out in a 3.5 liter glass reactor with a stainless steel top. The reactor was equipped with openings for addition of the required gas and liquid components, a dip tube for removal of cement (polymerization solution), an agitator to provide mixing and an internal coil to provide cooling. The continuous polymerizations were carried out at typical temperatures of about 35° C. and pressures of 30–50 psig. Hexane, monomers, catalyst and other components were added continuously to the reactor and the cement was removed continuously at a rate that maintained a constant level in the reactor.

The high purity hexane solvent was dried by pumping it through a column of silica gel followed by a column of 4A molecular sieves. The hexane storage and drying system was kept under nitrogen pressure. The reactor and all raw materials were prepared and handled in a manner to minimize the introduction of water and oxygen to the reactor.

Hexane was added continuously at a rate controlled by a calibrated metering pump. The hexane rate was set to give the desired reactor throughput. The ethylene and propylene were set to give the desired polymer composition and production rate.

The termonomer ethylidene norbornene (ENB), when used, was fed to the reactor as a solution in hexane. The solution was added with a metering pump at the rate required to give the desired ENB content in the polymer.

The flow of ammonia, hydrogen, ethylene and propylene gas streams to the reactor were controlled by mass flow controllers. These gases are combined at the outlet of the mass flow controllers for delivery to the reactor through the same feed line. The hydrogen concentration and the ethylene/propylene ratio in the reactor vapor space were determined at intervals during each run by an on-line GC (gas chromatograph). A continuous vent from the reactor vapor space was controlled by a mass flow controller. The vent supplied a fresh sample to the GC and kept the nitrogen entering with the hexane and inerts entering with the ethylene and propylene from building up in the reactor.

During polymerization, the ethylene and propylene feed rates as well as the hexane, ammonia and hydrogen were normally kept constant. One or more of the flows was adjusted on some experiments to control the polymer composition, molecular weight or production rate. The reactor temperature was controlled by the circulation rate of cool water through a tubular coil in the reactor. The temperature was controlled at the selected value by an automatic instrument control loop that regulated the flow of cooling water. The catalyst pump speed was also controlled by an instrument control loop. The speed was changed manually by setting the instrument signal to the pump or automatically in response to the deviation between the actual pressure and the set value. If the pressure was higher than the desired value, the pump speed was increased to increase, the catalyst feed rate and reaction rate. Since the temperature was held constant, the increased monomer consumption at the higher reaction rate caused the pressure to decrease. To increase the reactor pressure the catalyst feed rate was decreased.

The ethylene and propylene to the reactor were set at rates to maintain the hexane saturation equilibrium at the temperature, pressure and ethylene/propylene ratio desired plus the monomer (ethylene and propylene) corresponding to the desired polymer composition and production rate.

The polymerization was normally continued for 3 hours or longer at the initial conditions and after making a change in polymerization conditions. This allowed sufficient line-out time for the polymer collected to be representative of the polymerization conditions used.

The preferred transition metal component of the catalyst system consisted of $VOCl_3$ (Vanadium oxytrichloride), the activator was DEAC (Diethyl aluminum chloride), DCPAE (Dichlorophenylacetic acidethylester) was used as promoter, and $NH_3$ (ammonia) as the N-containing Lewis base. Other alkyl aluminum halides, promoters, and Lewis bases were tried as explained below. These components were diluted with hexane to concentrations suitable for the pump capacity and reactor conditions used. The Al/V ratio and promoter/vanadium ratio fed to the reactor were set by the relative strength of the solutions and the addition rates were held constant during each example. Each catalyst component entered the reactor as a separate feed stream. The reactor agitator quickly mixed the components into the polymerization liquid.

The feed rates below are typical of those used for these experiments. The hexane rate was 57.2 cc/min plus 1.8–5.0 cc/min hexane with the catalyst solutions. The ethylene feed rate was 1.80 SLPM (standard liters/min) and the propylene rate was 4.10 SLPM. The hydrogen feed rate was varied between 35 SCCPM (standard cc per minute) and 75 SCCPM. These rates gave about 10 mole % and 17 mole % hydrogen respectively in the reactor vapor space at the operating conditions used. These flow rates gave a reactor residence time of approximately 30 minutes with the normal reactor level of 2 liters. A typical ammonia feed rate was 1.61 SCCPM and the reactor vent rate was 250 SCCPM.

The cement (polymerization solution) leaving the reactor was continuously deactivated and washed with water in a second agitated vessel. The cement flow was controlled by an automatic flow control loop and the set rate was adjusted as necessary to maintain a constant level in the reactor. The cement and water entered the vessel as separate streams and exited together from the top of the vessel. The wash vessel was kept full of liquid by maintaining the pressure high enough to keep the ethylene and propylene in solution. The high speed agitator in the wash vessel gave very good water-cement contact and provided efficient removal of catalyst residues. Polymer recovered by simple evaporation of the solvent was analyzed for residual aluminum, vanadium and chloride content.

The water and cement layers were allowed to separate in the atmospheric pressure collection vessel. The water was drained off and antioxidant was added to the cement before recovering the polymer. After an initial line-out period during which the cement was discarded the steady state cement was collected continuously, usually in 1 hour portions. The solution viscosity and percent polymer were determined on the cement portions. The RSV, mole percent ethylene and GPC analysis, including molecular weight distribution, were determined for each polymer sample. The ENB content was determined for runs during which this termonomer was added.

The following examples employ $VOCl_3$, DEAC, DCPAE and ammonia as the catalyst system to polymerize very low molecular weight ethylene propylene copolymers with varying ethylene ($C_2$) content at 37.7° C.

| | | | Polymerization Conditions | | | Polymer Analysis | | | |
|---|---|---|---|---|---|---|---|---|---|
| | Al/V | DCPAE/V | Lewis Base (mM/L) | $H_2$ (Mole %) | Vapor Space $C_2/C_3$ | RSV | % $C_2$ Mole | MWD | Mileage (g/mM V) |
| 1 | 13 | 1.7 | 1.0 | 15 | 0.18 | 0.53 | 51 | 1.7 | 190 |
| 2 | 17 | 2.6 | 1.0 | 20 | 0.18 | 0.26 | 54 | 1.7 | 170 |
| 3 | 17 | 2.1 | 1.0 | 14 | 0.20 | 0.36 | 59 | 2.0 | 200 |
| 4 | 16 | 2.0 | 1.0 | 14 | 0.24 | 0.42 | 63 | 1.8 | 200 |
| 5 | 14 | 1.9 | 1.0 | 20 | 0.27 | 0.33 | 65 | 1.7 | 200 |
| 6 | 15 | 2.0 | 1.0 | 20 | 0.30 | 0.38 | 66 | 1.9 | 190 |
| The following examples, were prepared as above however, pyridine was used as the Lewis base. | | | | | | | | | |
| 7 | 13 | 2.2 | 1.0 | 20 | 0.20 | 0.31 | 58 | 1.9 | 180 |
| 8 | 13 | 2.3 | 1.0 | 20 | 0.18 | 0.23 | 50 | 1.9 | 130 |

The following examples and comparative examples illustrated the effect on mileage, molecular weight, and molecular weight distribution when the ethyl to chlorine ratio of the alkyl aluminum chloride is varied from 1 to 2 for catalyst systems with prior art promoter and no promoter. The mole ratio of Al/V was held constant at 19 and the ammonia was maintained at 1.0 mM/L. Polymerization temperature of 35° C. was used throughout. Comparative example 9 and example 10–11 were with DCPAE, comparative examples 12–14 used no promoter, and comparative examples 15–17 used n-butylperchlorocrotonate as promoter.

| | | Polymerization Conditions | | | Polymer Analysis | | | |
|---|---|---|---|---|---|---|---|---|
| | Et/Cl | Promoter V | $H_2$ (Mole %) | Vapor Space $C_2/C_3$ | RSV | % $C_2$ Mole | MWD | Mileage (g/mM V) |
| 9 | 1.0 | 2.0 | 11 | .26 | 1.06 | 49 | 2.4 | 410 |
| 10 | 2.0 | 1.8 | 9.0 | .23 | 0.49 | 54 | 2.0 | 175 |
| 11 | 2.0 | 1.8 | 17 | .25 | 0.29 | 54 | 1.9 | 160 |
| 12 | 1.0 | — | 11 | .23 | 1.1 | 49 | 3.0 | 80 |
| 13 | 2.0 | — | 9 | .21 | 0.8 | 55 | 5.0 | 45 |
| 14 | 2.0 | — | 15 | .17 | 0.51 | 54 | 6.5 | 45 |
| 15 | 1.0 | 1.7 | 11 | .24 | 1.04 | 49 | 2.5 | 510 |
| 16 | 2.0 | 1.8 | 10 | .23 | 0.56 | 49 | 2.0 | 260 |
| 17 | 2.0 | 1.9 | 18 | .26 | 0.38 | 49 | 1.9 | 280 |

This set of examples also demonstrate the lower level of catalyst residues retained in the polymer when the DCPAE/DEAC/$NH_3$ system is employed.

| | Al, ppm | V, ppm | Cl, ppm |
|---|---|---|---|
| 9 | 11 | 0.6 | 114 |
| 10 | 13 | 0.6 | 175 |
| 11 | 7 | 0.3 | 176 |
| 12 | 6 | 0.7 | 60 |
| 13 | 15 | 1.3 | 96 |
| 14 | 10 | 2.9 | 75 |
| 15 | 30 | 1.3 | 264 |
| 16 | 24 | 0.9 | 371 |
| 17 | 13 | 0.6 | 455 |

Comparative example 18 and examples 19–20 illustrate the effect of varying the quantity of the N-containing Lewis base on the molecular weight and molecular weight distribution with DCPAE/DEAC.

| | | | Polymerization Conditions | | | Polymer Analysis | | | | ppm | | |
|---|---|---|---|---|---|---|---|---|---|---|---|---|
| | Al/V | DCPAE/V | $H_2$ (Mole %) | $NH_3$ (mM/L) | Vapor $C_2/C_3$ | RSV | MWD | % $C_2$ Mole | Mileage (g/mM V) | Al | V | Cl |
| 18 | 19 | 1.7 | 11 | 0 | 0.22 | 0.62 | 2.0 | 52 | 240 | 7 | .6 | 156 |
| 19 | 18 | 1.8 | 11 | 0.5 | 0.20 | 0.53 | 1.9 | 54 | 220 | | | |
| 20 | 17 | 1.8 | 10 | 1.0 | 0.19 | 0.43 | 2.0 | 55 | 190 | 8 | .6 | 175 |

The following examples demonstrate the preparation of an EPDM incorporating varying amounts of ENB as the termonomer. Other reaction conditions were held constant at Al/V=15, DCPAE/V=2, $NH_3$=1.0 mM/L, $H_2$=20 mole %, vapor $C_2/C_3$=0.30, temperature=37.7° C.

| Polymer Analysis | | | |
|---|---|---|---|
| | RSV | Mole % $C_2$ | MWD | ENB C = C/1000C |
| 21 | 0.38 | 66 | 1.9 | 4.7 |
| 22 | 0.36 | 66 | 2.0 | 12.4 |

The following examples demonstrate the preparation of an EPDM incorporating varying amounts of vinyl norbornene (VN) as the termonomer. Reaction conditions were held constant at Al/V=9, DCPAE/V=1.8, $NH_3$=1.0mM/L, $H_2$=22 mole %, vapor $C_2/C_3$=0.20 and temperature=37.7° C. VN feed was varied to incorporate the amounts indicated below.

| Polymer Analysis | | | |
|---|---|---|---|
| | RSV | Mole % $C_2$ | MWD | VN, Wt. % |
| 23 | 0.28 | 58 | 2.0 | 1 |
| 24 | 0.32 | 59 | 2.9 | 4 |

I claim:

1. In a process for the solution copolymerization of ethylene, at least one other 1-alkene and up to 20 percent by weight of an aliphatic or alicyclic polyunsaturated monomer containing at least two carbon-to-carbon double bonds and 3–20 carbon atoms in the presence of a catalyst system comprising (1) a compound of vanadium, (2) at least one alkyl aluminum halide containing at least one alkyl group bonded directly to the aluminum, (3) an α-halo, ketoaromatic promoter and (4) a chain transfer agent, the improvement comprising carrying out the polymerization with at least one alkyl aluminum halide in which the molar ratio of alkyl groups to halogen atoms is at least 1.5 to produce a liquid copolymer having an RSV less than 0.6 in the presence of a nitrogen-containing Lewis base.

2. A process as defined in claim 1 wherein the ratio of alkyl groups to halogen atoms is within the range of 1.75 to 2.5.

3. A process as defined in claim 1 wherein the 1-alkene is propylene.

4. A process as defined in claim 1 wherein the polyunsaturated monomer is selected from the group consisting of conjugated dienes and non-conjugated dienes.

5. A process as defined in claim 1 wherein the polyunsaturated monomer is selected from the group consisting of a norbornadiene, alkylidene norbornene and vinyl norbornene.

6. A method as defined in claim 1 wherein the vanadium compound is selected from the group consisting of vanadium tetrachloride, vanadium tetrabromide, vanadium oxytrichloride and vanadium acetyl acetonate.

7. A method as defined in claim 1 wherein the alkyl aluminum halide is a compound in which the alkyl group contains 1 to 30 carbon atoms and the halogen atom or atoms is chloride or bromide.

8. A process as defined in claim 1 wherein the promoter has the formula:

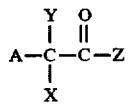

wherein

A is selected from the group consisting of phenyl, substituted derivatives thereof, thienyl, furyl, pyrrolyl, N-alkyl pyrrolyl and pyridyl group;

X is a chlorine or bromine atom;

Y is selected from the group consisting of chlorine, bromine, and A; and

Z is selected from the group consisting of the following:

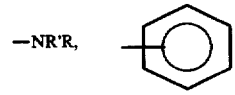

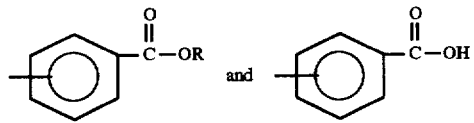

in which R and R' are each selected from the group consisting of a hydrocarbon group containing 1 to 8 carbon atoms and wherein n is an integer from 1 to 4.

9. A process as defined in claim 1 wherein the nitrogen-containing Lewis base is selected from the group consisting of ammonia, primary aliphatic and aromatic amines and secondary aliphatic and aromatic amines containing 2 to 12 carbon atoms.

10. A process as defined in claim 1 wherein the Lewis base is present in an amount corresponding to 0.5 to 3 millimoles per liter of polymerization solvent.

11. A process as defined in claim 1 wherein the polyunsaturated monomer is vinyl norbornene.

12. A process as defined in claim 1 wherein the polyunsaturated monomer is ethylidene norbornene.

* * * * *